(12) United States Patent
Osseiran et al.

(10) Patent No.: US 8,842,599 B2
(45) Date of Patent: Sep. 23, 2014

(54) RELAY NODE SELECTION FOR NETWORK CODING

(75) Inventors: Afif Osseiran, Kista (SE); Jawad Manssour, Stockholm (SE)

(73) Assignee: Unwired Planet, LLC, Reno, NV (US)

( * ) Notice: Subject to any disclaimer, the term of this patent is extended or adjusted under 35 U.S.C. 154(b) by 256 days.

(21) Appl. No.: 13/058,381

(22) PCT Filed: Aug. 15, 2008

(86) PCT No.: PCT/SE2008/050924
§ 371 (c)(1),
(2), (4) Date: Feb. 10, 2011

(87) PCT Pub. No.: WO2010/019082
PCT Pub. Date: Feb. 18, 2010

(65) Prior Publication Data
US 2011/0134828 A1     Jun. 9, 2011

(51) Int. Cl.
| | | |
|---|---|---|
| H04B 7/14 | (2006.01) | |
| H04B 7/155 | (2006.01) | |
| H04W 72/12 | (2009.01) | |
| H04B 17/02 | (2006.01) | |
| H04W 84/04 | (2009.01) | |
| H04L 1/00 | (2006.01) | |

(52) U.S. Cl.
CPC ....... H04B 7/15521 (2013.01); *H04W 72/1226* (2013.01); *H04B 17/02* (2013.01); *H04W 84/047* (2013.01); *H04L 2001/0097* (2013.01)
USPC ................................. 370/315; 370/336; 455/7

(58) Field of Classification Search
None
See application file for complete search history.

(56) References Cited

U.S. PATENT DOCUMENTS

| | | | | |
|---|---|---|---|---|
| 5,880,958 | A  * | 3/1999 | Helms et al. | 701/117 |
| 7,869,344 | B1 * | 1/2011 | Kamal et al. | 370/216 |
| 8,050,213 | B2 * | 11/2011 | Sun et al. | 370/315 |
| 2006/0146716 | A1 * | 7/2006 | Lun et al. | 370/238 |
| 2006/0252367 | A1 | 11/2006 | Haartsen | |
| 2008/0188177 | A1 * | 8/2008 | Tan et al. | 455/11.1 |
| 2009/0185491 | A1 * | 7/2009 | Schollmeier et al. | 370/238 |
| 2009/0268790 | A1 * | 10/2009 | Josiam et al. | 375/211 |
| 2009/0285148 | A1 * | 11/2009 | Luo et al. | 370/315 |
| 2010/0039980 | A1 * | 2/2010 | Unger | 370/315 |
| 2011/0026429 | A1 * | 2/2011 | Ben Slimane et al. | 370/252 |
| 2012/0263100 | A1 * | 10/2012 | Yuan et al. | 370/315 |
| 2013/0012119 | A1 * | 1/2013 | Ma et al. | 455/9 |

OTHER PUBLICATIONS

Jing, Y. et al. "Single and Multiple Relay Selection Schemes and Their Diversity Orders." IEEE International Conference on Communications Workshops, May 19-23, 2008, pp. 349-353.

(Continued)

*Primary Examiner* — Bunjob Jaroenchonwanit
(74) *Attorney, Agent, or Firm* — Nixon & Vanderhye, P.C.

(57) ABSTRACT

A base station in a wireless network receives link quality data from multiple relay nodes that relay data from the user terminals to the base station and/or from user terminals. The base station applies one or more cost functions to the link quality data and selects a relay node from the multiple relay nodes for network coding of data from a group of the user terminals based on results of the one or more cost functions. The base station notifies the selected relay node to network code data from the group of user terminals.

20 Claims, 11 Drawing Sheets

(56) References Cited

OTHER PUBLICATIONS

Peng, C. et al. "On the Performance Analysis of Network-Coded Cooperation in Wireless Networks." 26th IEEE International Conference on Computer Communications, May 6-12, 2007, pp. 1460-1468.

Woldegebreal, D. H. et al. "Multiple-Access Relay Channel with Network Coding and Non-Ideal Source-Relay Channels." 4th International Symposium on Communication Systems, Oct. 17-19, 2007, pp. 732-736.

Bao et al., "Matching Code-on-Graph with Network-on-Graph: Adaptive Network Coding for Wireless Relay Networks," Proceedings of the Annual Allerton Conference on Communication, Control, and Computing, Sep. 28, 2005, pp. 1-10.

Pu et al., "Continuous Network Coding in Wireless Relay Networks," INFOCOM 2008: the 27th Conference on Computer Communications, Apr. 13, 2008, pp. 2198-2206, IEEE, Piscataway, NJ.

Tajer et al., "Opportunistic Cooperation via Relay Selection with Minimal Information Exchange," International Symposium on Information Theory (ISIT2007), Jun. 24-29, 2007, pp. 1926-1930, IEEE, Nice, France.

Wu et al, "Information Exchange in Wireless Networks with Network Coding and Physical-Layer Broadcast", Technical Report MSR-TR-2004-78, Microsoft Research, Aug. 2004.

Li et al, "Linear Network Coding", IEEE Transactions on Information Theory, vol. 49, No. 2, Feb. 2003, pp. 371-381.

Ahlwsede et al, "Network Information Flow", IEEE Transactions on Information Theory, vol. 46, No. 4, Jul. 2000, pp. 1204-1216.

Chen et al, "Wireless Diversity Through Network Coding", IEEE WCNC Proceedings, 2006.

Ho et al, "The Benefits of Coding Over Routing in a Randomized Setting", IEEE Proc. Int'l Symp. Information Theory, Yokohama, Japan, Jun. 2003.

Zhang et al, "Physical-Layer Network Coding", MobiCom '06: Proceedings of the 12th annual international conference on Mobile computing and networking, pp. 358-365, 2006.

Popovski et al, "The Anti-Packets Can Increase the Achievable Throughput of a Wireless Multi-Hop Network", Conference on Communication (ICC2006), Istanbul, Turkey, Jun. 2006.

\* cited by examiner

RELAY NODE SELECTION FOR NETWORK CODING

TECHNICAL FIELD

Implementations described herein relate generally to relaying in wireless communication systems and, more particularly, to selection of a relay node from multiple relay nodes for network coding of data of a group of user terminals in a cell of a wireless communication system.

BACKGROUND

A driving force in the development of wireless/cellular communication networks and systems has been to provide increased network coverage and/or to support higher data rates. At the same time, the cost aspect of building and maintaining the system is of great importance and is expected to become even more so in the future. As data rates and/or communication distances are increased, the problem of increased battery consumption is another area of concern. Until recently, the main topology of wireless communication systems has been fairly unchanged, including the three existing generations of cellular networks. The topology of existing wireless communication systems is characterized by a cellular architecture that includes fixed radio base stations and mobile stations as the only transmitting and receiving entities in the networks typically involved in a communication session.

A technique for introducing macro-diversity in a received signal involves the use of relaying systems where information sent to an intended destination may be conveyed through various routes and combined at the destination. Each route may consist of one or more hops utilizing the relay nodes. In addition, the destination may receive the direct signal from the source. Cooperative relaying systems can be divided into numerous categories based on desired parameters. For instance, the way the signal is forwarded and encoded at the relay station can be classified into two categories: amplify-and-forward and decode-and-forward. In the amplify-and-forward case, the relays simply amplify and forward the received signal. In the decode-and-forward case, the relays demodulate and decode the signal prior to re-encoding and re-transmission.

Present day communication networks, described above, share the same fundamental principle of operation: the information or packet sent from a source to a destination is transported independently from other information sent from another source to the same destination. Routers, repeaters and relays simply forward the data to the destination. In contrast to those communication networks, network coding (NC) is a new area of networking, in which data is manipulated inside the network (e.g., at an intermediate node, N) to improve throughput, delay and robustness. In particular, NC allows instead the nodes to recombine several input packets into one or several output packets. At the intermediate node (referred to as the network coding node) some type of linear coding can be performed on the packets present at the network coding node, and the resulting encoded packet can be broadcast for different recipients simultaneously instead of transmitting each packet separately.

In wireless communications, network coding can be divided into two schemes: analog network coding and digital network coding. In analog network coding, coding may be performed at the signal level. This may consist of letting the analog signals add up in the air through simultaneous transmissions (i.e., by letting two signals interfere with each other intentionally). The coding (i.e., signal addition) may then occur at the intermediate relay node and both decode-and-forward and amplify-and-forward techniques may be employed in analog network coding. In digital network coding, coding may be performed at the packet level, with encoding being performed on the bits of the packets. The encoding may include XOR operations, or other types of bit operations, being performed on the bits of the packets. Digital network coding may be performed only with decode-and-forward relays, since the network coding node needs to possess decoding capabilities. When network coding is applied to a wireless relay network, a relay node may play the role of a network coding node.

As network coding combines the data of different user terminals together, this implies that the data of these users should be available at the node (i.e., the relay node, typically) over which network coding is performed. In a system in which more than one relay node is available per cell, the issue of relay node selection arises. When selecting a relay node, it is not necessarily the relay node that is closest to a user terminal of a group of user terminals to be network coded that provides the best performance. When network coding is introduced in a cell that includes more than one relay node, a relay selection scheme is needed that selects a relay node for network coding, where the selection scheme is not simply based on an individual user terminal without any consideration to other user terminals in the group of user terminals being network coded, since such a selection could detrimentally affect other user terminals in the group of user terminals.

SUMMARY

Exemplary embodiments described herein provide a network coding relay node selection scheme that selects one relay node out of a set of relay nodes at which network coding of a group of user terminals (e.g., a pair of user terminals) may be performed. The relay node selection scheme may choose a relay node for network coding that may be jointly suitable for all of the user terminals of a group of user terminals, or may choose a relay node for network coding that is most suitable for only one, or a few, of the user terminals of the group of user terminals. The relay node selection scheme may rely on link quality information related to the links from the user terminals to the relay nodes, and/or the connection quality from the relay nodes to the serving base station, for selecting a relay node for network coding of data from a group of user terminals. One or more cost functions are used for relay node selection. The cost functions include relay selection based on a cost function that maximizes a sum capacity, relay node selection based on a cost function that minimizes generated interference, relay node selection based on a cost function that determines the most favorable long-term channel condition towards a user terminal that has the weakest direct radio channel connection with the serving base station, relay node selection based on a cost function that determines the most favorable long-term channel conditions towards a user terminal that has the strongest direct radio channel connection with the serving base station, and/or relay node selection based on a cost function that determines the most favorable long-term channel conditions with the serving base station. The relay node selection scheme described herein permits the use of network coding in a cell that improves data throughput, delay and robustness and further permits the selection of a relay node for performing the network coding that increases system spectral efficiency, reduces system outages, and improves performance for a group of user terminals.

According to one aspect, a method performed in a system including user terminals, multiple relay nodes and a base station includes receiving link quality data from the multiple relay nodes that relay data from the user terminals to the base station and/or from the user terminals. The method further includes applying one or more cost functions to the link quality data and selecting a relay node from the multiple relay nodes for network coding of data from a group of the user terminals based on results of the one or more cost functions. The method also includes notifying the selected relay node to network code data from the group of user terminals.

According to a further aspect, a base station that serves multiple user terminals via multiple relay nodes in a cell of a wireless network includes a processing unit and a transceiver. The processing unit is configured to identify a group of user terminals of the multiple user terminals for network coding, and to select a relay node from the multiple relay nodes based on link qualities and/or channel conditions between the group of user terminals and the multiple relay nodes, between the base station and the multiple relay nodes, and/or between the user terminals and the base station. The transceiver may be configured to transmit a message instructing the selected relay node to network code data transmitted from the identified group of user terminals.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Figure 1:
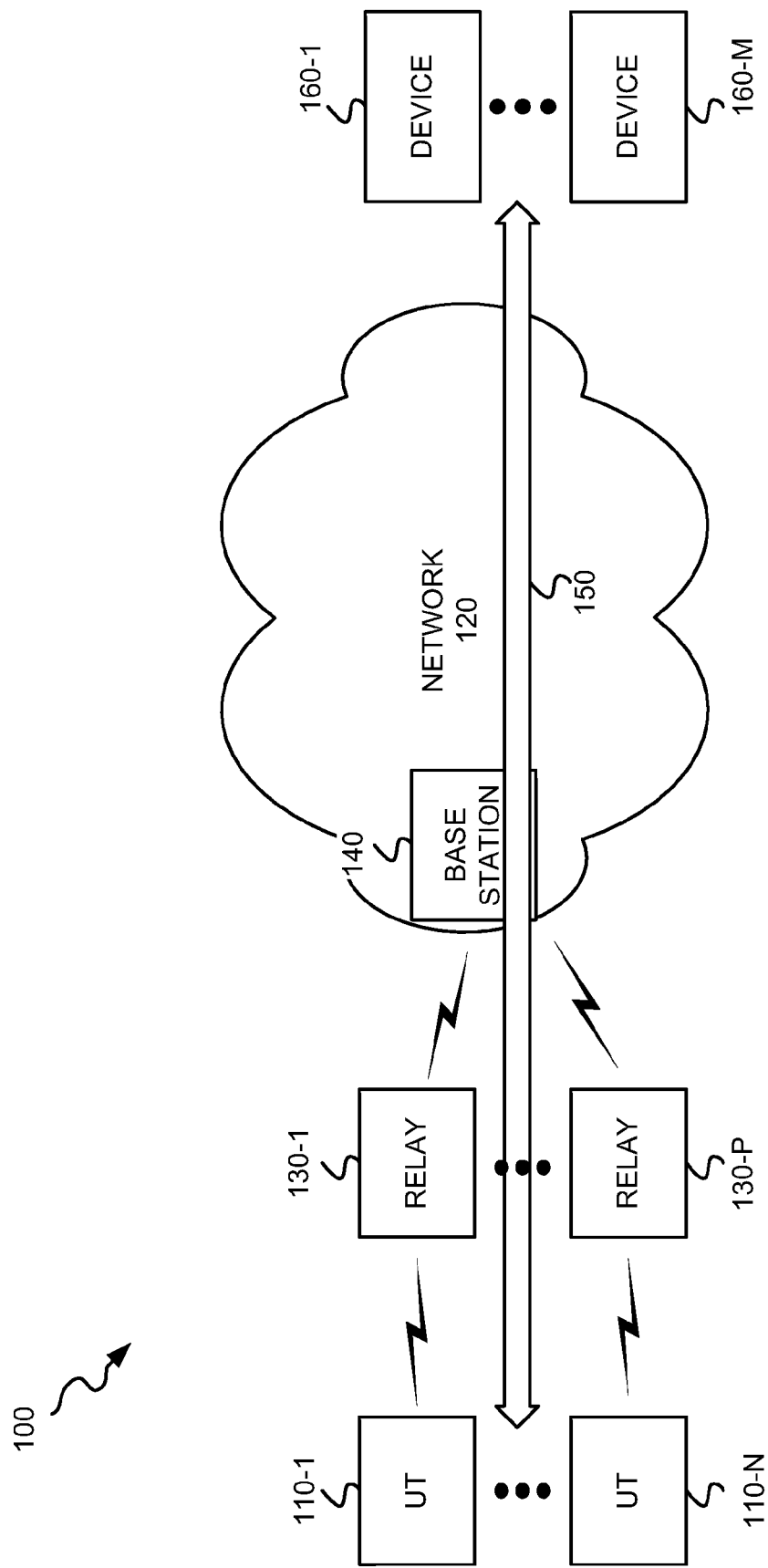
FIG. 1 illustrates an exemplary communications system in which implementations described herein may be implemented.

FIG. 1 illustrates an exemplary communications system 100 that may include multiple user terminals (UT) 110-1 through 110-N connected to a network 120 via multiple relay nodes 130-1 through 130-P and a base station 140. UTs 110-1 through 110-N may communicate 150 with devices 160-1 through 160-M via relays 130-1 through 130-P and base station 140 (and other components of network 120 not shown in FIG. 1). Thus, relay nodes 130-1 through 130-P and base station 140 may function as intermediate components of system 100 that may be used to facilitate end-to-end communication between UTs 110-1 through 110-N and devices 160-1 through 160-M.

UTs 110-1 through 110-N (referred to collectively as UTs 110 and in some instances singularly as UT 110) may include cellular radiotelephones, personal digital assistants (PDAs), Personal Communications System (PCS) terminals, laptop computers, palmtop computers, or any other types of devices or appliances that include a communication transceiver that permits the device to communicate with other devices via a wireless link. A PCS terminal may combine a cellular radiotelephone with data processing, facsimile and data communications capabilities. A PDA may include a radiotelephone, a pager, an Internet/intranet access device, a web browser, an organizer, calendars and/or a global positioning system (GPS) receiver. UTs 110-1 through 110-N may be referred to as "pervasive computing" devices.

Relay nodes 130-1 through 130-P may include wireless nodes that receive data transmissions from multiple ones of user terminals 110-1 through 110-N and network code (described further below) and relay the received data transmissions to base station 140. The network coding performed by relay nodes 130-1 through 130-P may include analog or digital network coding. The digital network coding typically involves combining data (e.g., linearly or non-linearly) from a group of user terminals, such as, for example, XOR bitwise encoding, Reed Solomon encoding, modulus encoding, or other types of operations for combining data bits from different user terminals of a group of user terminals such that the combined encoded data represents a smaller quantity of data relative to the original, uncombined data transmitted from each of the user terminals of the group of user terminals.

Base station 140 may include a wireless station that may interface with network 120 and may receive data from network 120 for transmission to destination UTs 110-1 through 110-N via relay nodes 130-1 through 130-P, and may received network coded data from relay nodes 130-1 through 130-P and may send the data via network 120 towards an intended destination.

Devices 160-1 and 160-M may include similar devices to UTs 110-1 through 110-N and, in some implementations, may additionally include telephones (e.g., Plain Old Telephone system (POTs) telephones) that are connected to a Public Switched Telephone Network (PSTN).

Network(s) 120 may include one or more networks of any type, including a local area network (LAN); a wide area network (WAN); a metropolitan area network (MAN); a telephone network, such as a PSTN or a PLMN; a satellite network; an intranet, the Internet; or a combination of networks. The PLMN(s) may further include a packet-switched sub-network, such as, for example, General Packet Radio Service (GPRS), Cellular Digital Packet Data (CDPD), or Mobile IP network.

Figure 2:
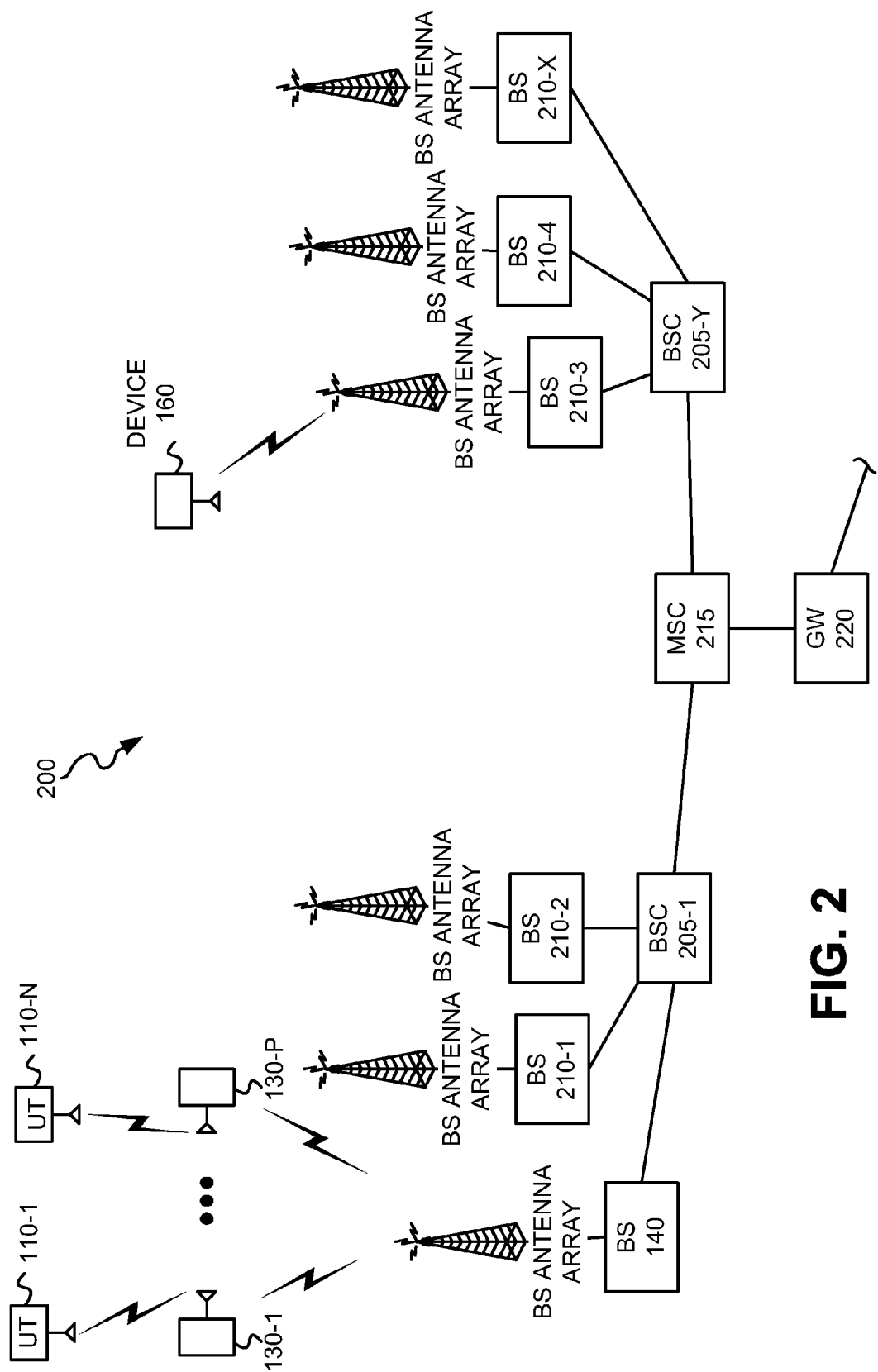
FIG. 2 illustrates an exemplary implementation in which a network of the system of FIG. 1 includes a Public Land Mobile Network (PLMN)

FIG. 2 illustrates an example of system 100 of FIG. 1, where network 120 includes a PLMN 200. As shown in FIG. 2, UTs 110-1 and 110-N and device 160 may include cellular radiotelephones.

PLMN 200 may include one or more base station controllers (BSCs) 205-1 through 205-Y (alternatively called "radio network controllers" (RNCs) in some implementations), multiple base stations (BSs) 140 and 210-1 through 210-X along with their associated antenna arrays, one or more mobile switching centers (MSCs), such as MSC 215, and one or more gateways (GWs), such as GW 220. PLMN 200 may additionally include components (not shown) for connecting PLMN 200 to a packet-switched network, such as a Packet Data Network (PDN), such that UTs 110-1 through 110-N and device 160 can send and/or receive packet-switched data from the PDN. The components for connecting PLMN 200 to the PDN may include a Serving GPRS Support Node (SGSN) and a Gateway GPRS Support Node (GGSN) (not shown).

Base stations 140 and 210-1 through 210-X may format the data transmitted to, or received from, the antenna arrays in accordance with existing techniques and may communicate with BSCs 205-1 through 205-Y or with a device, such as device 160. Among other functions, BSCs 205-1 through 205-Y may route received data to either MSC 215 or a base station (e.g., BSs 140 or 210-1 through 210-X). MSC 215 may route received data to BSC 205-1, 205-Y, or GW 220. GW 220 may route data received from an external domain (not shown) to an appropriate MSC (such as MSC 215), or from an MSC to an appropriate external domain. In one implementation, the external domain may include a different PLMN or a PSTN.

Figure 3A:
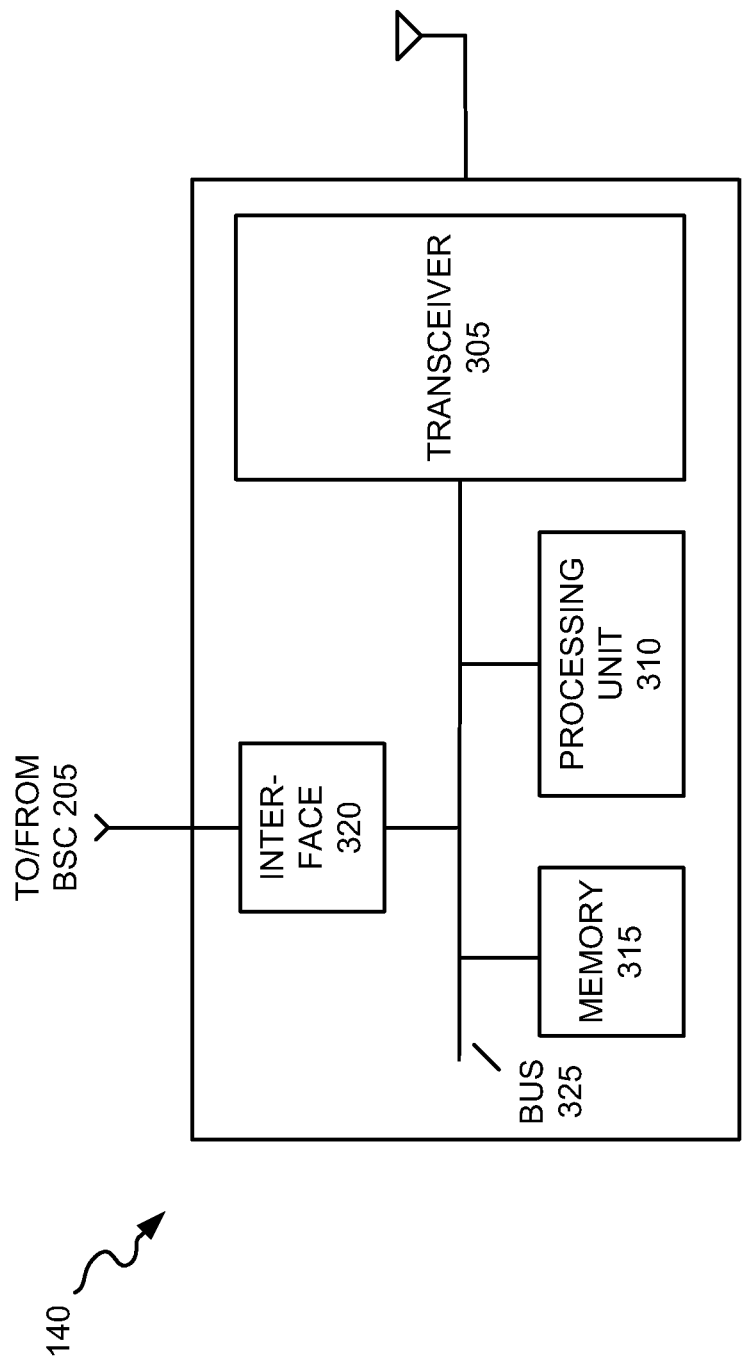
FIG. 3A illustrates exemplary components of the base station of FIG. 1.

FIG. 3A illustrates one exemplary implementation of BS 140. Base stations 210-1 through 210-X may be similarly configured. BS 140 may include a transceiver 305, a processing unit 310, a memory 315, an interface 320 and a bus 325.

Transceiver 305 may include transceiver circuitry for transmitting and/or receiving symbol sequences using radio frequency signals via one or more antennas. Processing unit 310 may include a processor, microprocessor, or processing logic that may interpret and execute instructions. Processing unit 310 may perform all data processing functions. Memory 315 may provide permanent, semi-permanent, or temporary working storage of data and instructions for use by processing unit 310 in performing data processing functions. Memory 315 may include read only memory (ROM), random access memory (RAM), large-capacity storage devices, such as a magnetic and/or optical recording medium and its corresponding drive, and/or other types of memory devices. Interface 320 may include circuitry for interfacing with a link that connects to a BSC (e.g., BSC 205-1 or BSC 205-2). Bus 325 may interconnect the various components of BS 140 to permit the components to communicate with one another.

The configuration of components of BS 140 illustrated in FIG. 3A is for illustrative purposes only. Other configurations with more, fewer, or a different arrangement of components may be implemented.

Figure 3B:
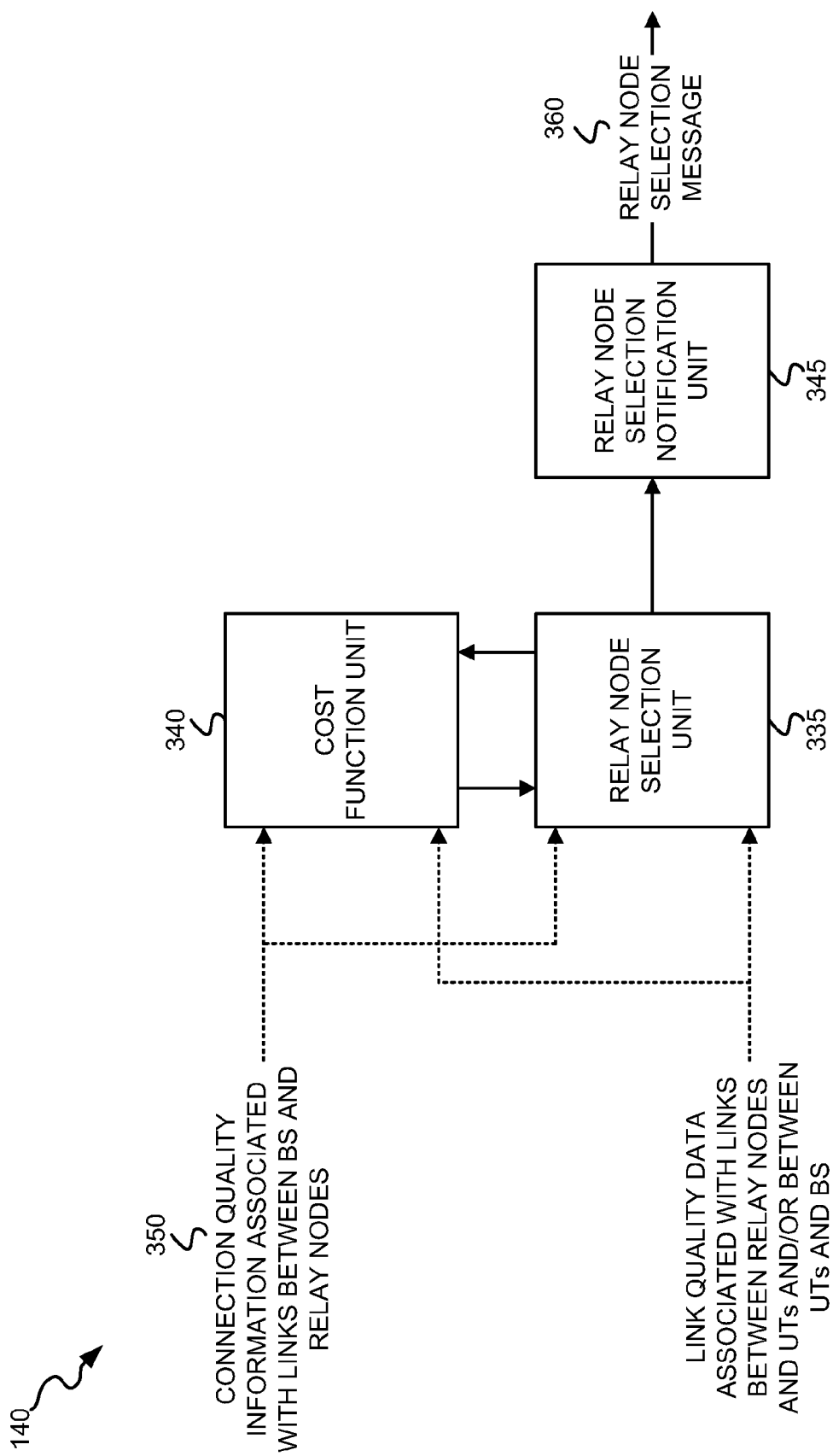
FIG. 3B illustrates an exemplary function diagram of the base station of FIG. 1.

FIG. 3B illustrates a functional diagram of base station 140 according to an exemplary implementation. The various functional components shown in FIG. 3B may be implemented by processing unit 310, memory 315, transceiver 305, and possibly other components of base station 140. Base station 140 may include a relay node selection unit 335, a cost function unit 340, and a relay node selection notification unit 345.

Relay node selection unit 335 may receive connection quality information 350 associated with links between base station 140 and relay nodes 130-1 through 130-P, and may also receive link quality data 355 associated with links between relay nodes 130-1 through 130-P and user terminals 110-1 through 110-N and/or between user terminals 110-1 through 110-N and base station 140. Relay node selection unit 335 may use the received information, either with or without input from cost function unit 340, to select one of relay nodes 130-1 through 130-P for network coding and relaying data transmissions from a group of user terminals of user terminals 110-1 through 110-N. In some implementations, relay node selection unit 335 may select a relay node from relay nodes 130-1 through 130-P for network coding based only on received link qualities and connection qualities. In other implementations, relay node selection unit 335 may use the received link quality and connection qualities to determine channel conditions between the group of user terminals and relay nodes 130-1 through 130-P or between base station 140 and relay nodes 130-1 through 130-P. Relay node selection unit 335 may use the determined channel conditions to select the relay node for network coding.

In still other implementations, relay node selection unit 335 may base the relay node selection on one or more cost functions implemented by cost function unit 340. Such cost functions may include a cost function that selects a relay node that maximizes a sum capacity, a cost function that selects a relay node that minimizes generated interference, a cost function that selects a relay node that has the most favorable long-term channel condition towards a user terminal that has the weakest direct radio channel connection with the serving base station, a cost function that selects a relay node that has the most favorable long-term channel conditions towards a user terminal that has the strongest direct radio channel connection with the serving base station, and/or a cost function that selects a relay node that has the most favorable long-term channel conditions with the serving base station. In some exemplary embodiments, multiple cost functions may be used together for relay node selection. Exemplary cost functions are described in more detail below with respect to FIG. 7.

Relay node selection notification unit 345 may determine which group of user terminals of user terminals 110-1 through 110-N is to be network coded and may construct a message 360 that identifies each of the user terminals of the group of user terminals and which further identifies the relay node selected by relay node selection unit 335. Relay node selection notification unit 345 may initiate transmission of message 360 to the selected relay node (and possibly to other nodes).

Figure 4A:
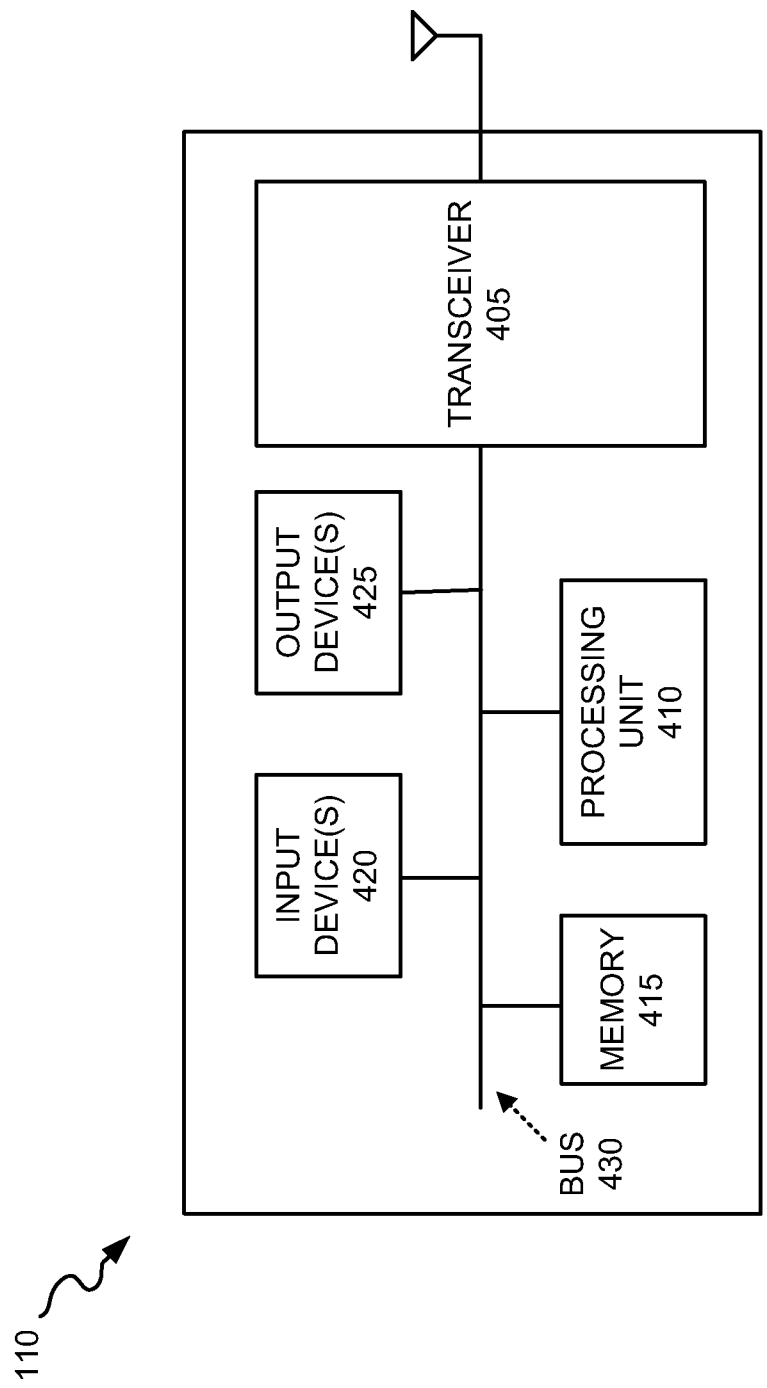
FIG. 4A illustrates exemplary components of a user terminal of FIG. 1.

FIG. 4A illustrates exemplary components of a UT 110. Relays 130-1 through 130-P may be similarly configured. UT 110 may include a transceiver 405, a processing unit 410, a memory 415, an input device(s) 420, an output device(s) 425, and a bus 430.

Transceiver 405 may include transceiver circuitry for transmitting and/or receiving symbol sequences using radio frequency signals via one or more antennas. Transceiver 405 may include, for example, a RAKE or a GRAKE receiver. Processing unit 410 may include a processor, microprocessor, or processing logic that may interpret and execute instructions. Processing unit 410 may perform all data processing functions for inputting, outputting, and processing of data including data buffering and device control functions, such as call processing control, user interface control, or the like.

Memory 415 may provide permanent, semi-permanent, or temporary working storage of data and instructions for use by processing unit 410 in performing device processing functions. Memory 415 may include ROM, RAM, large-capacity storage devices, such as a magnetic and/or optical recording medium and its corresponding drive, and/or other types of memory devices. Input device(s) 420 may include mechanisms for entry of data into UT 110. For example, input device(s) 420 may include a keypad, a microphone or a display unit. The keypad may permit manual user entry of data into UT 110. The microphone may include mechanisms for converting auditory input into electrical signals. The display unit may include a screen display that may provide a user interface (e.g., a graphical user interface) that can be used by a user for selecting device functions. The screen display of the display unit may include any type of visual display, such as, for example, a liquid crystal display (LCD), a plasma screen display, a light-emitting diode (LED) display, a cathode ray tube (CRT) display, an organic light-emitting diode (OLED) display, etc.

Output device(s) 425 may include mechanisms for outputting data in audio, video and/or hard copy format. For example, output device(s) 425 may include a speaker that includes mechanisms for converting electrical signals into auditory output. Output device(s) 425 may further include a display unit that displays output data to the user. For example, the display unit may provide a graphical user interface that displays output data to the user. Bus 430 may interconnect the various components of UT 110 to permit the components to communicate with one another.

The configuration of components of UT 110 illustrated in FIG. 4A is for illustrative purposes only. Other configurations with more, fewer, or a different arrangement of components may be implemented.

Figure 4B:
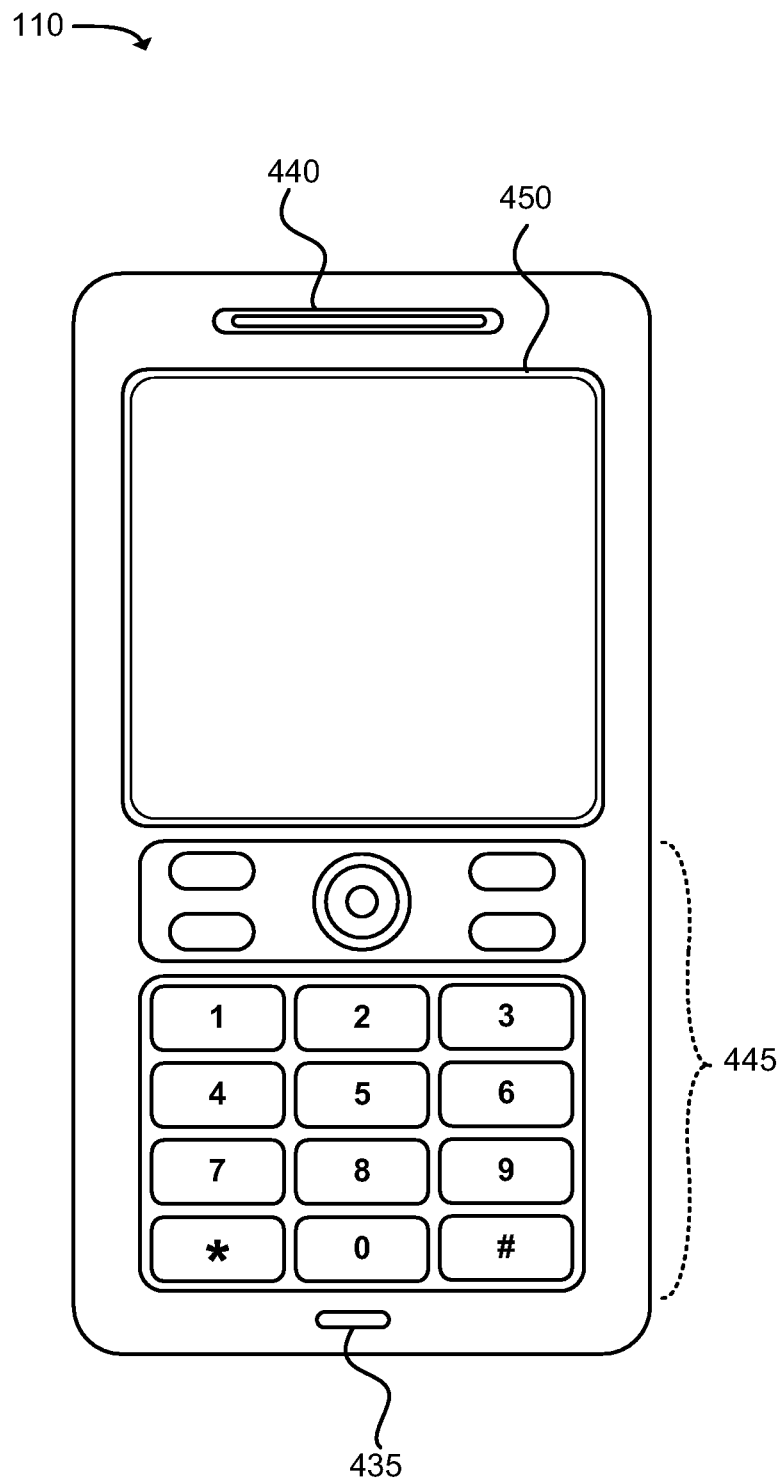
FIG. 4B illustrates an exemplary implementation of the user terminal of FIG. 4A where the user terminal is a cellular radiotelephone.

FIG. 4B illustrates an exemplary implementation of UT 110 in which UT 110 includes a cellular radiotelephone. As shown in FIG. 4B, the cellular radiotelephone may include a microphone 435 (e.g., of input device(s) 420) for entering audio information into UT 110, a speaker 440 (e.g., of output device(s) 425) for providing an audio output from UT 110, a keypad 445 (e.g., of input device(s) 420) for manual entry of data or selection of device functions, and a display 450 (e.g., of input device(s) 420 and/or output device(s) 425) that may visually display data to the user and/or which may provide a user interface that the user may use to enter data or to select device functions (e.g., in conjunction with keypad 445).

Figure 5:
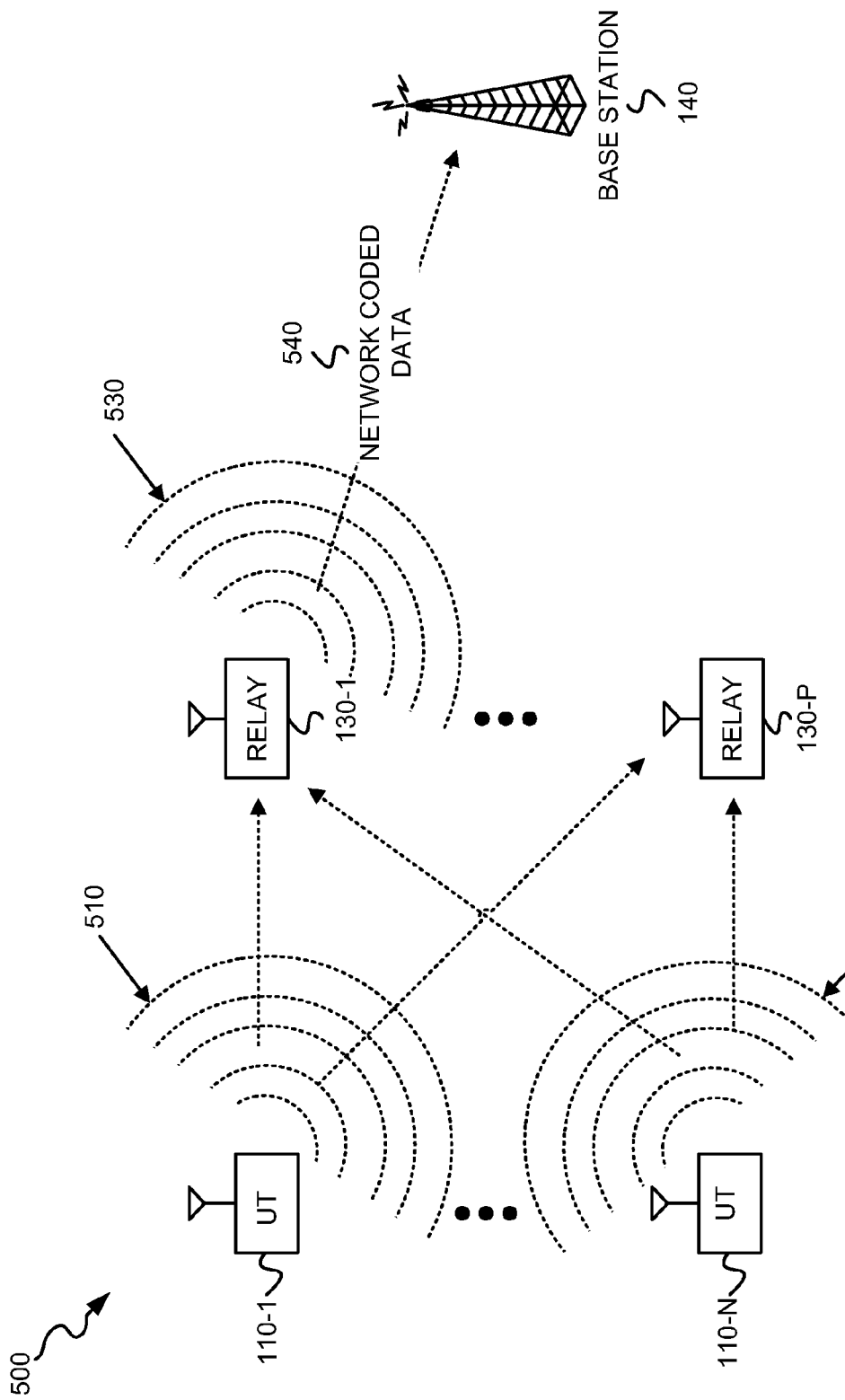
FIG. 5 illustrates the use of relay nodes for relaying and network coding data transmissions received from a group of user terminals to a base station.

FIG. 5 illustrates an example 500 of the use of relay nodes 130-1 through 130-P for relaying and network coding data transmissions received from a group of user terminals UTs 110-1 through 110-N to base station 140. As shown in FIG. 5, UT 110-1 may transmit 510 data in a cell occupied by relay nodes 130-1 through 130-P such that relay nodes 130-1 through 130-P receive the data transmission. UT 110-N may also transmit 520 data in the cell occupied by relay nodes 130-1 through 130-P such that relay nodes 130-1 through 130-P receive the data transmission. A selected one of relay nodes 130-1 through 130-P (relay node 130-1 shown as a selected relay node in FIG. 5 by way of example) may then network code the data transmissions from UTs 110-1 through 110-N and relay/transmit 530 the network coded data 540 to base station 140. The exemplary operations described with respect to FIG. 7 below provide further details of the selection of the relay node from relay nodes 130-1 through 130-P for network coding.

Figure 6:
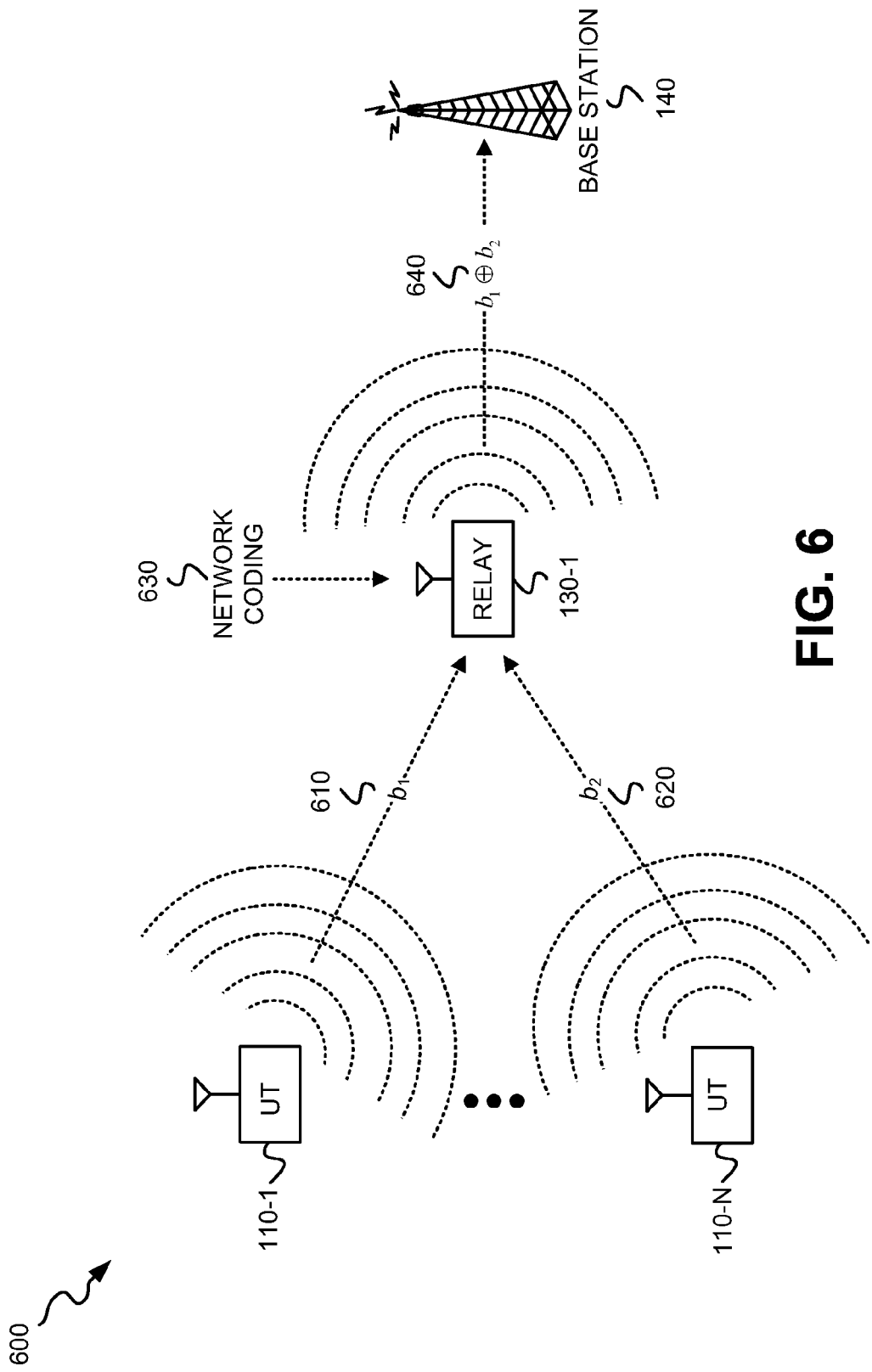
FIG. 6 depicts further details of the network coding and relaying of data transmissions from a group of user terminals by a selected relay node.

FIG. 6 further depicts details 600 of the network coding of data transmissions from UTs 110-1 through 110-N by a selected relay node. Subsequent to selection of a relay node, as described above with respect to FIG. 5, the selected relay node may be utilized for relaying and network coding data transmitted from a selected group of user terminals. For purposes of illustration, FIG. 6 depicts relay node 130-1 as the selected relay node for performing network coding. As shown in FIG. 6, UT 110-1 transmits data $b_1$ 610 to selected relay node 130-1 and UT 110-N transmits data $b_2$ 620 to selected relay node 130-1. Upon receipt of data $b_1$ 610 and $b_2$ 620, relay node 130-1 may perform network coding 630 on the data, and then may relay/transmit the network coded data 640 to base station 140. In the exemplary implementation depicted in FIG. 6, relay node 130-1 is depicted as using Exclusive OR operations (XOR-$\oplus$) to network code the data $b_1$ 610 and $b_2$ 620 received from UTs 110-1 and 110-N. In other implementations, different network coding schemes may be used.

Figure 7:
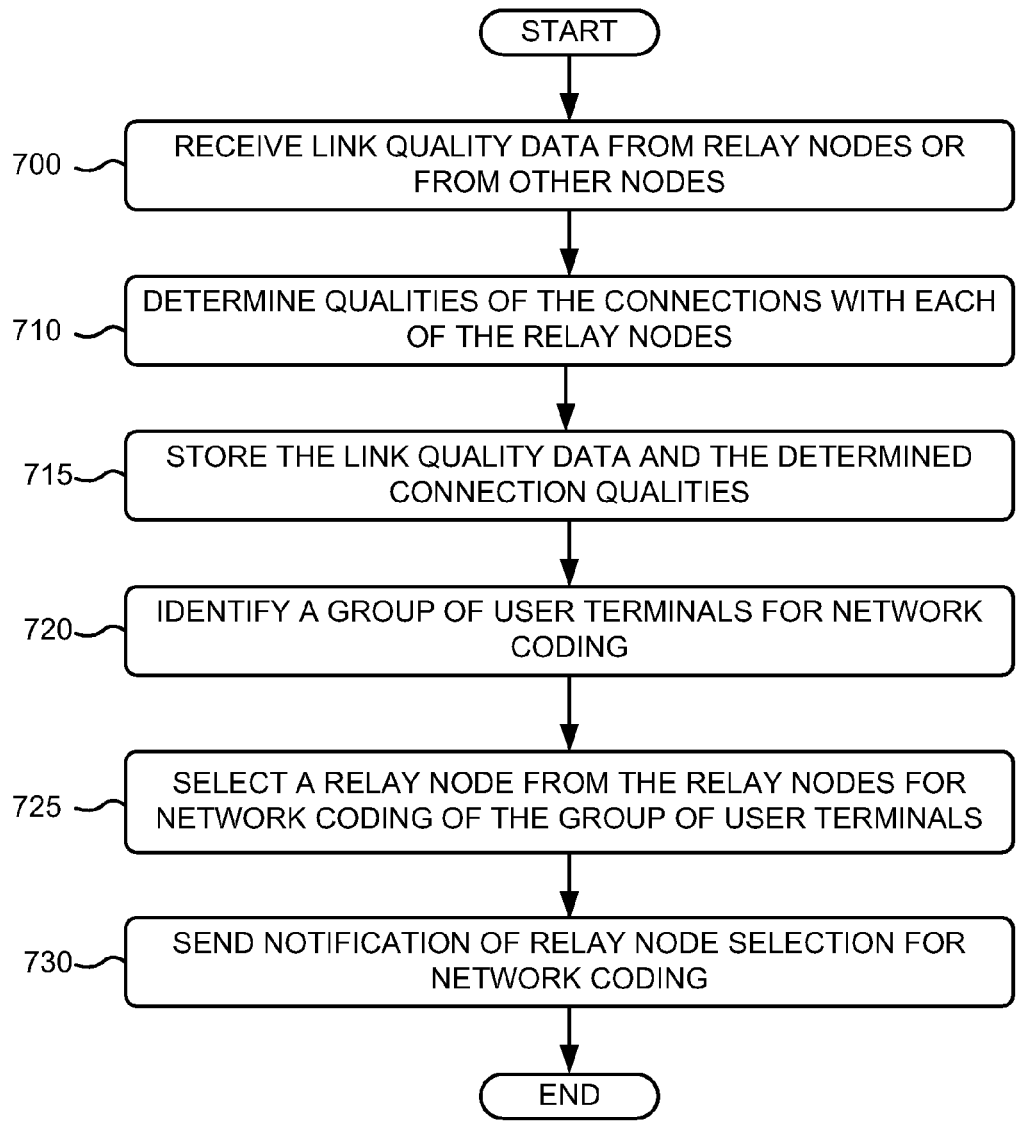
FIG. 7 is a flowchart that illustrates exemplary operations associated with selecting a relay node from multiple relay nodes in a cell for the network coding of data received from a group of user terminals.

FIG. 7 is a flowchart that illustrates exemplary operations associated with selecting a relay node from multiple relay nodes in a cell for the network coding of data received from a group of user terminals. The exemplary operations of FIG. 7 may be implemented by base station 140. In other implementations, the exemplary operations of FIG. 7 may be implemented by one or more devices that includes or excludes base station 140. The exemplary operations of FIG. 7 are described below with reference to the messaging diagram of FIG. 8.

Figure 8:
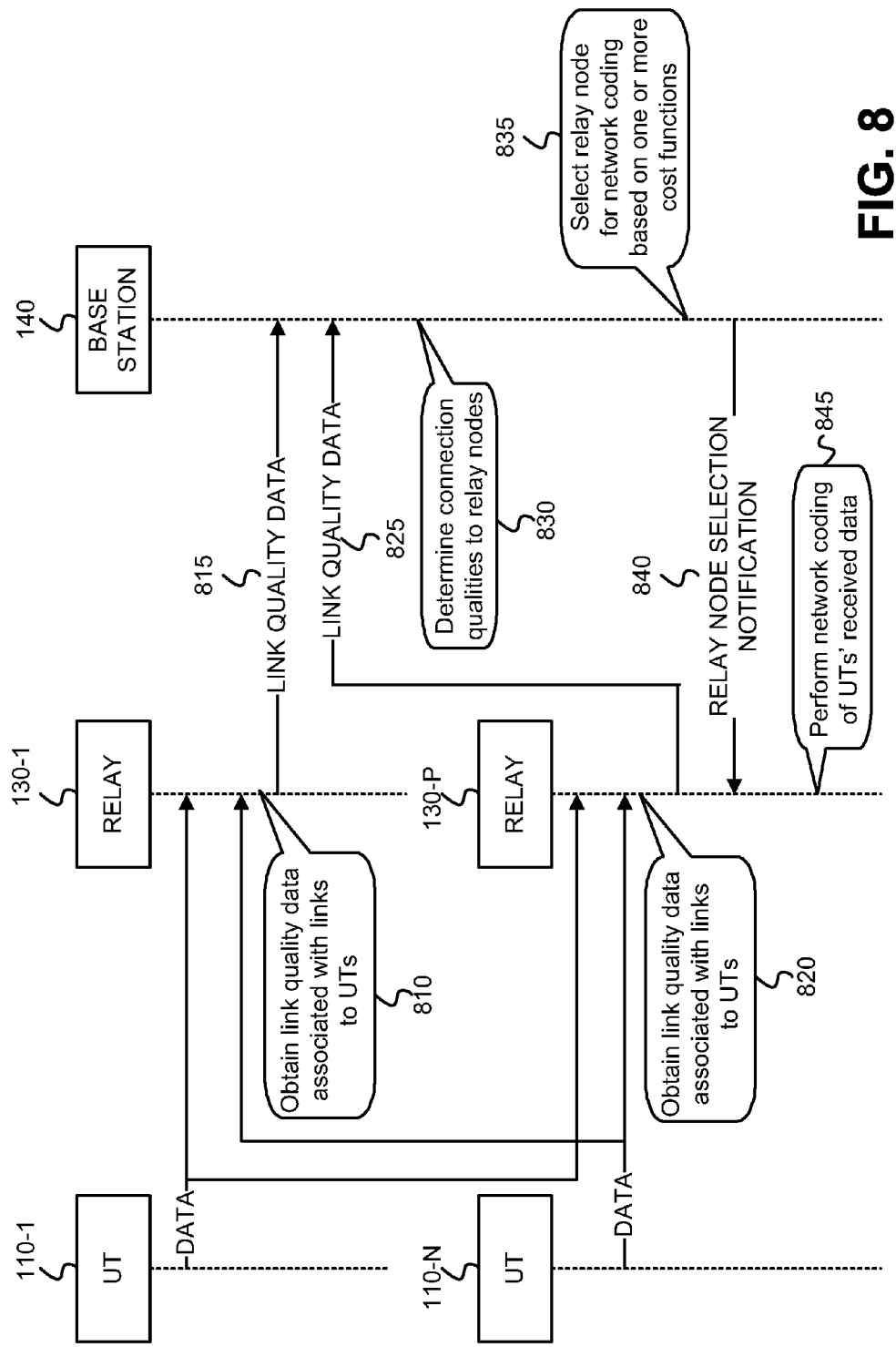
FIG. 8 is a messaging diagram that depicts exemplary messaging, between user terminals, relay nodes and the base station of FIG. 1, associated with the relay node selection operations of FIG. 7.

The exemplary operations may begin with the receipt of link quality data from relay nodes or from other nodes (block 700). Each of relay nodes 130-1 through 130-P may measure a quality of the link with each of UTs 110-1 through 110-N. The measured link quality may include, for example, a Signal-to-Interference-Noise-Ratio (SINR) and/or estimates of channel conditions. Each of UTs 110-1 through 110-N may also measure a link quality with each of relay nodes 130-1 through 130-P and may send the link quality information to respective ones of relay nodes 130-1 through 130-P, or directly to base station 140. Each of relay nodes 130-1 through 130-P may send the link quality data to base station 140 for receipt by relay node selection unit 335 and cost function unit 340. Relay nodes 130-1 through 130-P may also measure link qualities associated with links to UTs 110-1 through 110-N or with base station 140. The received link quality data may permit base station 140 to identify which of UTs 110-1 through 110-N that has the weakest direct radio channel connection to base station 140 and which of UTs 110-1 through 110-N that has the strongest direct radio channel connection to base station 140. FIG. 8 depicts relay nodes 130-1 and 130-P obtaining 810 and 820 link quality data associated with links to UTS 110-1 and 110-N. Relay node nodes 130-1 and 130-P may measure link quality data associated with links to UTs 110-1 and 110-N, and/or may receive messages from UTs 110-1 and 110-N that include link quality data. As further shown in FIG. 8, relay node 130-1 may subsequently send link quality data 815 to base station 140 and relay node 130-P may subsequently send link quality data 825 to base station 140.

Qualities of the connections between base station 140 and each of the relay nodes may be determined (block 710). Base station 140 may measure a connection/link quality that base station 140 has with each one of relay nodes 130-1 through 130-P. The measured connection/link qualities may include SINR measurements, estimates of channel conditions and/or other types of connection/link quality parameters. Relay node selection unit 335 and cost function unit 340 may receive the connection quality information. FIG. 8 depicts base station 140 determining 830 connection qualities to the relay nodes (e.g., relay nodes 130-1 and 130-P).

The link quality data and determined connection qualities may be stored (block 715). The link quality data and the determined connection qualities may be stored, for example, in a data structure in memory 315. The stored link quality data and the determined connection qualities may be used for a historical analysis of link quality towards each of relay nodes 130-1 through 130-P and towards each of UTs 110-1 through 110-N. For example, the stored link quality data may be analyzed to determine short and/or long-term channel conditions towards each of UTs 110-1 through 110-N or each of relay nodes 130-1 through 130-P.

A group of user terminals may be identified for network coding (block 720). The group of user terminals may include at least two of UTs 110-1 through 110-N and may be selected based on any type of user terminal grouping algorithm, such as, for example, the user terminal grouping algorithm described in International Application No. PCT/SE2008/050413.

A relay node from relay nodes 130-1 through 130-P may be selected for network coding of the group of user terminals (block 725). The relay node may be selected by relay node selection unit 335 using one or more selection schemes. For example, one selection scheme may include selecting a relay node from relay nodes 130-1 through 130-P that maximizes a sum capacity of the group of user terminals. Another selection scheme may include selecting a relay node from relay nodes 130-1 through 130-P that results in a lower interference to other user terminals, relay nodes and/or base stations as opposed to selecting other relay nodes of relay nodes 130-1 through 130-P. Other selection schemes may include selecting the relay node that is more suitable to a user terminal that has the weakest direct radio channel connection to the serving base station, selecting the relay node that is more suitable to a user terminal that has the strongest direct radio channel connection to the serving base station, or selecting the relay node that has a best connection with the serving base station. The selection scheme(s) used to select the relay node from relay nodes 130-1 through 130-N for network coding may use the received link quality data and/or the determined connection qualities from blocks 700, 710 and 720.

The selection schemes used to select the relay node from relay nodes 130-1 through 130-N may include one or more cost functions that may be implemented by cost function unit 340. For the following exemplary cost functions, let $\{h_{r_i}, j, 1\}_{j=1,2}$ be the radio channel between the $j^{th}$ user terminal and the $r_i^{th}$ relay node of base station 1 and assume that there are $N_r$ relay nodes per cell:

a) select the relay node (RN) i* that maximizes the sum capacity (C) according to, for example:

$$i^* = \underset{i \in \{1,\ldots,N_r\}}{\operatorname{argmax}} C(U_1, U_2, RN_i) \quad \text{(Eqn. 1)}$$

where $U_1$ is a first user terminal and $U_2$ is a second user terminal.

b) select the relay node i* that minimizes the generated interference (I) according to, for example:

$$i^* = \underset{i \in \{1,\ldots,N_r\}}{\operatorname{argmax}} I(U_1, U_2, RN_i) \quad \text{Eqn. (2)}$$

where the interference may be measured at other base stations, relay nodes and/or user terminals (e.g., base stations, relay nodes and/or user terminals from other cells).

c) select the relay node i* that has the most favorable long-term channel conditions toward the user terminal 110 that has the weakest direct radio channel connection with base station 140 according to, for example:

$$i^* = \underset{i \in \{1,\ldots,N_r\}}{\operatorname{argmax}} E[|h_{r_i,1,1}|^2] \quad \text{Eqn. (3)}$$

d) select the relay node i* that has the most favorable long term channel conditions towards the user terminal 110 that has the strongest direct radio channel connection with base station 140 according to, for example:

$$i^* = \underset{i \in \{1,\ldots,N_r\}}{\operatorname{argmax}} E[|h_{r_i,2,1}|^2] \quad \text{Eqn. (4)}$$

e) select the relay node i* that has the most favorable long-term channel conditions with base station 140 according to:

$$i^* = \underset{i \in \{1,\ldots,N_r\}}{\operatorname{argmax}} E[|g_{r_i,1}|^2] \quad \text{Eqn. (5)}$$

where $g_{r_i,1}$ is the radio channel between the $r_i^{th}$ relay node and base station 1. The exemplary cost functions of equations (1) through (5) may be used alone, or in any combination, to select the relay node from relay nodes 130-1 through 130-P for performing network coding of data from a group of user terminals. FIG. 8 depicts base station 140 selecting 835 a relay node for network coding based on the one or more cost functions described above.

A notification of the relay node selection for network coding may be sent to the selected relay node (block 730). Base station 140 may send a notification message to the selected relay node instructing the relay node to perform network coding on a selected group of user terminals. FIG. 8 depicts base station 140 sending a relay node selection notification message 840 to relay node 130-P notifying relay node 130-P of its selection for performing network coding on a selected group of user terminals. Notification message 840 may include an identification of the user terminals of the group of user terminals on which the selected relay node (e.g., relay node 130-P in this example) may perform network coding.

Figure 9:
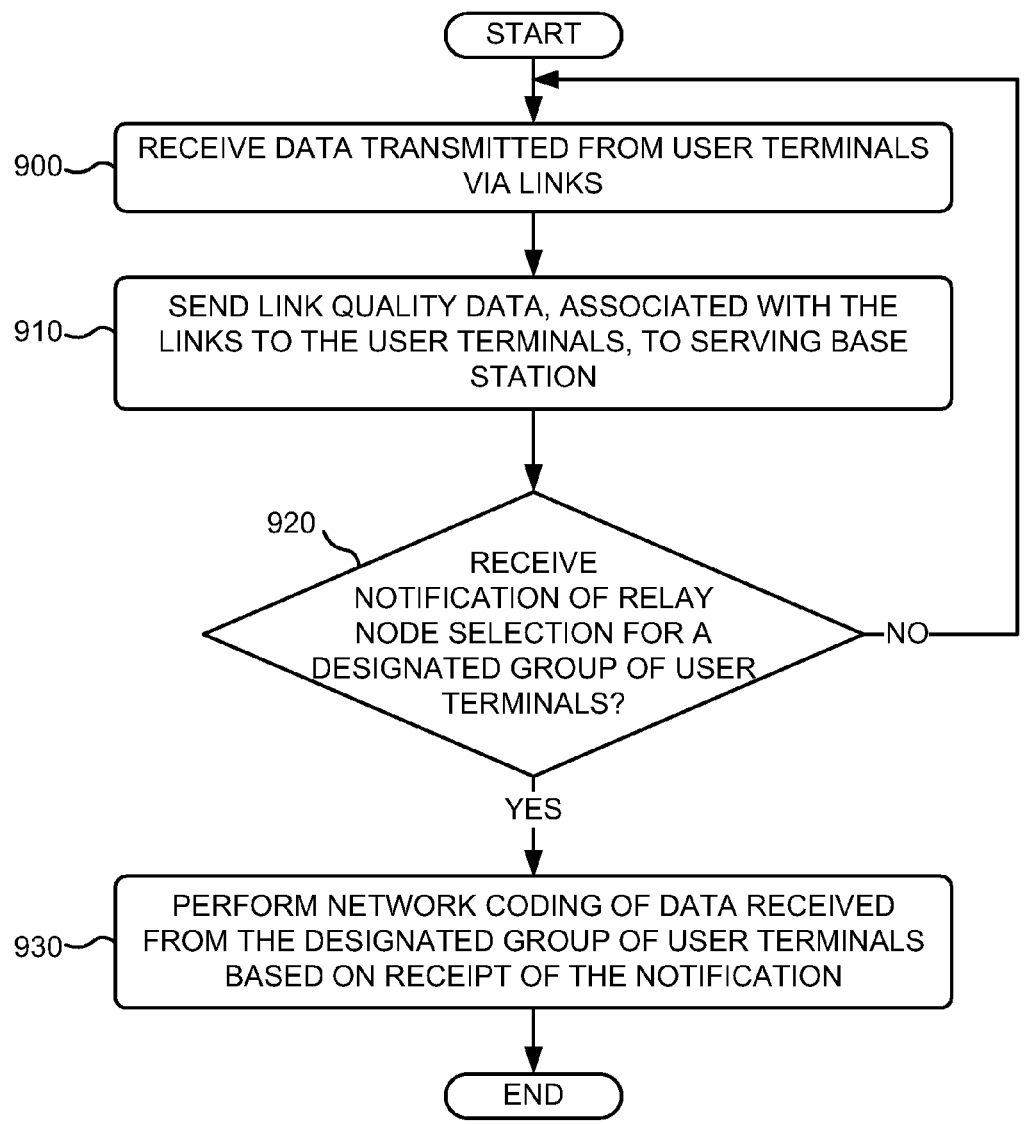
FIG. 9 is a flowchart that illustrates exemplary operations associated with network coding of data from a group of user terminals, received at a relay node, subsequent to the relay node being selected from multiple relay nodes for the network coding.

FIG. 9 is a flowchart that illustrates exemplary operations associated with network coding of data from a group of user terminals, received at a relay node, subsequent to the relay node being selected from a plurality of relay nodes for the network coding. The exemplary operations of FIG. 9 may be implemented by a relay node of relay nodes 130-1 through 130-P. The exemplary operations of FIG. 9 are described below with reference to the messaging diagram of FIG. 8.

The exemplary operations may begin with the receipt of data transmitted from user terminals via links (block 900). As shown in the exemplary messaging diagram of FIG. 8, UT 110-1 may transmit data 800 that may be received by relay node 130-1 and 130-P and UT 110-N may transmit data 805 that may also be received by relay node 130-1 and 130-P. Link quality data, associated with the links to the user terminals, may be sent to the serving base station (block 910). The relay node may measure link quality data associated with links to the user terminals, and/or may receive messages from the user terminals that include the link quality data. As further shown in the messaging diagram of FIG. 8, relay node 130-1 may obtain 810 link quality data associated with the links to UTs 110-1 and 110-N and relay node 130-P may obtain 820 link quality data associated with links to UTs 110-1 and 110-N.

A determination may be made whether a notification of relay node selection for a designated group of user terminals has been received (block 920). Each relay node of relay nodes 130-1 through 130-P may determine whether a notification message has been received from the serving base station (e.g., base station 140). When a notification message is received (block 920—YES), then the selected relay node (e.g., relay node 130-P in the example of FIG. 8) may perform network coding of data received from the designated group of user terminals based on receipt of the notification (block 930). As shown in the example of FIG. 8, relay node 130-P may receive a relay node selection notification message 840 from base station 140 and may perform 845 network coding of the designated group of UTs' received data. If a relay node selection notification is not received by the relay node, then the exemplary operations may return to block 900 above.

The foregoing description of implementations provides illustration and description, but is not intended to be exhaustive or to limit the invention to the precise form disclosed. Modifications and variations are possible in light of the above teachings, or may be acquired from practice of the invention. For example, while series of blocks have been described with regard to FIGS. 7 and 9, the order of the blocks may be modified in other implementations consistent with the principles of the invention. Further, non-dependent blocks may be performed in parallel.

Aspects of the invention may also be implemented in methods and/or computer program products. Accordingly, the invention may be embodied in hardware and/or in software (including firmware, resident software, microcode, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement the embodiments described herein is not limiting of the invention. Thus, the operation and behavior of the embodiments were described without reference to the specific software code—it being understood that one of ordinary skill in the art would be able to design software and control hardware to implement the aspects based on the description herein.

Furthermore, certain portions of the invention may be implemented as "logic" that performs one or more functions. This logic may include hardware, such as an application specific integrated circuit or field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

It should be emphasized that the term "comprises/comprising" when used in this specification is taken to specify the presence of stated features, integers, steps, components or groups but does not preclude the presence or addition of one or more other features, integers, steps, components or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed in a system comprising user terminals, a base station, and a plurality of relay nodes that relay data between the user terminals and the base station, the method comprising:
   receiving from the plurality of relay nodes link quality data that is associated with links between the user terminals and the relay nodes, links between the user terminals and the base station, or both;
   applying one or more cost functions to the link quality data;
   selecting, based on results obtained from applying the one or more cost functions, one of the plurality of relay nodes to network code data from a group of the user terminals; and
   notifying the selected relay node to network code data from the group of user terminals, wherein said notifying comprises transmitting a message identifying at least two user terminals in the group and wherein network coding comprises input packets from different user terminals of the group of user terminals being combined into one or several output packets.

2. The method of claim 1, wherein the method is implemented at the base station.

3. The method of claim 1, wherein said notifying comprises notifying the selected relay node of the group of user terminals to be network coded.

4. The method of claim 3, wherein network coding comprises combining the data from the group of user terminals.

5. The method of claim 4, where combining the data from the group of user terminals comprises at least one of XOR encoding, Reed Solomon encoding, or modulus encoding the data from the group of user terminals.

6. The method of claim 1, further comprising determining qualities of the connections between the base station and the plurality of the relay nodes, and wherein said selecting is further based on the determined qualities.

7. The method of claim 1, wherein applying one or more cost functions comprises applying a cost function that selects the relay node that minimizes generated interference to at least one of another base station, the user terminals, and the relay nodes.

8. The method of claim 1, wherein applying one or more cost functions comprises applying a cost function that selects the relay node that maximizes a sum capacity of the system.

9. A base station configured to serve a plurality of user terminals via a plurality of relay nodes in a cell of a wireless network, the base station comprising:
   a processing unit configured to:
      identify a group of user terminals from the plurality of user terminals; and
      select from the plurality of relay nodes a relay node to network code data from the identified group of user terminals based on at least one of link qualities, connection qualities, and channel conditions between:
         the identified group of user terminals and the plurality of relay nodes,
         the base station and the plurality of relay nodes, or
         the identified group of user terminals and the base station; and
   wherein the base station further comprises a transceiver configured to transmit a message identifying at least two user terminals in the group of user terminals and instructing the selected relay node to network code data transmitted from the identified at least two user terminals in the group of user terminals, wherein network coding comprises input packets from different user terminals of the group of user terminals being combined into one or several output packets.

10. The base station of claim 9, wherein the transceiver is further configured to receive link quality data describing said link qualities from the plurality of relay nodes, the plurality of user terminals, or both.

11. The base station of claim 9, wherein the processing unit is configured to determine at least one of a connection quality between the base station and the plurality of relay nodes, and a link quality between the base station and the plurality of user terminals, and to select the relay node further based on at least one of said connection quality and said link quality.

12. The base station of claim 9, wherein the processing unit is configured to:
apply one or more cost functions to one or more of the link qualities, connection qualities, and channel conditions; and
select the relay node based on the results obtained from applying the one or more cost functions.

13. The base station of claim 9, wherein the processing unit is configured to apply a cost function that selects the relay node which minimizes generated interference to at least one of another base station, the user terminals, and the relay nodes.

14. The base station of claim 9, wherein the processing unit is configured to apply a cost function that selects the relay node which maximizes a sum capacity of the wireless network.

15. A method performed in a system comprising user terminals, a base station, and a plurality of relay nodes that relay data between the user terminals and the base station, the method comprising:
receiving data from the user terminals via links with the user terminals;
obtaining link quality data associated with the links with the user terminals;
transmitting the link quality data to the base station;
receiving a relay node selection notification from the base station to network code data from a group of the user terminals, the notification identifying at least two user terminals in the group; and
performing network coding of data received from user terminals of the group of the user terminals, wherein performing network coding comprises combining input packets from different user terminals of the group of user terminals into one or several output packets.

16. The method of claim 15, comprising transmitting the one or several output packets to the base station.

17. The method of claim 15, wherein the method is implemented at a relay node at the plurality of relay nodes.

18. A relay node configured to:
receive data from user terminals via links with the user terminals;
obtain link quality data associated with the links with the user terminals;
transmit the link quality data to a base station;
receive a relay node selection notification from the base station to network code data from a group of the user terminal, the notification identifying at least two user terminals in the group; and
perform network coding of data received from user terminals of the group of the user terminals, wherein performing network coding comprises combining input packets from different user terminals of the group of user terminals into one or several output packets.

19. A method performed in a system comprising user terminals, a base station, and a plurality of relay nodes that relay data between the user terminals and the base station, the method comprising:
receiving, at one or more of the plurality of relay nodes, data from the user terminals via links with the user terminals;
obtaining, at the one or more of the plurality of relay nodes, link quality data associated with the links with the user terminals;
transmitting the link quality data from the one or more of the plurality of relay nodes to the base station;
receiving the link quality data at the base station from the plurality of relay nodes;
applying, at the base station, one or more cost functions to the link quality data;
selecting, at the base station, based on results obtained from applying the one or more cost functions, one of the plurality of relay nodes to network code data from a group of the user terminals, wherein said network coding comprises combining input packets from different user terminals of the group of user terminals into one or several output packets;
notifying the selected relay node to network code data from the group of user terminals, said notifying comprising transmitting a message identifying at least two user terminals in the group;
receiving, at the selected relay node, a relay node selection notification from the base station to network code data from the group of the user terminals; and
performing, at the selected relay node, network coding of data received from user terminals of the group of the user terminals, wherein performing network coding comprises combining input packets from different user terminals of the group of user terminals into one or several output packets.

20. A system comprising:
a relay node configured to:
receive data from user terminals via links with the user terminals;
obtain link quality data associated with the links with the user terminals; and
transmit the link quality data to a base station; and
a base station configured to:
receive the link quality data;
apply one or more cost functions to the link quality data;
select, based on results obtained from applying the one or more cost functions, a relay node to network code data from a group of the user terminals, wherein said network coding comprises combining input packets from different user terminals of the group of user terminals into one or several output packets; and
notify the selected relay node to network code data from the group of user terminals,
wherein the relay node is further configured to:
receive a relay node selection notification from the base station to network code data from the group of the user terminals, said notification identifying at least two user terminals in the group; and
perform network coding of data received from user terminals of the group of the user terminals, wherein performing network coding comprises combining input packets from different user terminals of the group of user terminals into one or several output packets.

* * * * *

UNITED STATES PATENT AND TRADEMARK OFFICE
CERTIFICATE OF CORRECTION

| | | |
|---|---|---|
| PATENT NO. | : 8,842,599 B2 | Page 1 of 1 |
| APPLICATION NO. | : 13/058381 | |
| DATED | : September 23, 2014 | |
| INVENTOR(S) | : Osseiran et al. | |

It is certified that error appears in the above-identified patent and that said Letters Patent is hereby corrected as shown below:

IN THE SPECIFICATION;

Column 8, line 42, change "UTS" to --Uts-- and after "Relay" delete "node".

Column 9, line 47, change "(Eqn. (1) to --Eqn. (1)--.

IN THE CLAIMS:

Column 12, Line 28, in Claim 5, line 1, change "where" to --wherein--.

Column 13, Line 59, in Claim 18, change "terminal" to --terminals--.

Signed and Sealed this
Seventeenth Day of February, 2015

Michelle K. Lee
*Deputy Director of the United States Patent and Trademark Office*